United States Patent [19]

Foley et al.

[11] 4,105,492

[45] Aug. 8, 1978

[54] TREATED GLASS FIBERS

[75] Inventors: Kevin M. Foley, Maumee; Anil K. Rastogi; Joseph P. Rynd, both of Granville, all of Ohio

[73] Assignee: Owens-Corning Fiberglas Corporation, Toledo, Ohio

[21] Appl. No.: 828,377

[22] Filed: Aug. 29, 1977

Related U.S. Application Data

[63] Continuation-in-part of Ser. No. 680,325, Jul. 26, 1976, abandoned, which is a continuation of Ser. No. 461,326, Apr. 16, 1974, abandoned.

[51] Int. Cl.$^2$ .................... C03C 25/06; B32B 13/02
[52] U.S. Cl. .................................... 156/629; 156/663; 427/403
[58] Field of Search .................... 427/327 R, 403; 156/629, 663

[56] References Cited

U.S. PATENT DOCUMENTS 3,663,254  5/1972  Wade .................................. 427/372

FOREIGN PATENT DOCUMENTS 7,361,800  8/1973  Japan ..................................... 427/372

*Primary Examiner*—James R. Hoffman
*Attorney, Agent, or Firm*—Ronald C. Hudgens; Patrick P. Pacella; W. Preston Hickey

[57] ABSTRACT

A method of preparing glass fibers having a surface enriched by zirconium dioxide thereon, comprising the steps of: applying an aqueous solution of zirconyl carbonate to the surface of the glass fibers, keeping the fibers wetted under ambient conditions for a period of time to effect ion exchange with water extractable ions in the surface of the glass, and evaporate the water to leave the coated glass fibers. The coated glass fibers are especially suited for reinforcing cementitious materials.

7 Claims, No Drawings

TREATED GLASS FIBERS

This is a continuation-in-part of application Ser. No. 680,325 filed Apr. 26, 1976; which in turn is a continuation of application Ser. No. 461,326 filed Apr. 16, 1974, both now abandoned.

This invention relates to treated glass fibers. More particularly, this invention relates to treated glass fibers suitable for reinforcing cement and concrete.

BACKGROUND OF THE INVENTION

Until quite recently, it has not been advisable to use glass fibers for long term (five or more years) reinforcement of hydrous calcium silicate crystals, cement, concrete, mortar or other cementitious materials or matrices that have a high alkali content. The harsh alkali environment would degrade the types of glass fibers, E glass for example, commonly used to reinforce non-alkali materials such as plastics.

E glass fibers are not generally recommended for the long term reinforcement of Portland cement or other cementitous products. The alkali content of the cementitious matrix attacks the E glass fiber surface and substantially weakens the fibers. This alkali attack and subsequent fiber strength loss generally so weakens the fiber that long term reinforcement of the matrix by the E glass fibers is neither predictable nor dependable.

To remedy this situation, the prior art has tried a number of potential solutions. One is to coat the fibers with some material that is alkali resistant. Epoxy resin coated fibers, for example, generally will withstand alkali attack. Another potential solution is to use a high alumina cement which has less alkali content. Still another solution is to formulate a glass composition which in fiber form will be resistant to alkali attack.

BRIEF SUMMARY OF THE INVENTION

We have now discovered that glass fibers coated with zirconium dioxide are especially suited for reinforcing cementitious materials.

Accordingly, an object of this invention is to provide glass fibers the surface of which is enriched with zirconium.

Another object of this invention is to provide cementitious materials reinforced with glass fibers having an ion exchange treatment with zirconium oxide.

Other objects, aspects and advantages of this invention will be apparent to one skilled in the art from the following disclosure and appended claims.

DETAILED DESCRIPTION

Any commercially available glass fibers, such as those produced from E glass, can be used in the practice of this invention. It is preferred to use alkali resistant glass fibers, especially calcium hydroxide resistant glass fibers, with the concepts of this invention.

CROSS REFERENCES TO RELATED APPLICATIONS

Alkali-resistant glass fibers that can be employed include those disclosed in British Pat. Specification Nos. 1,243,972 and 1,290,528 and in U.S. Pat. Application Ser. No. 275,613 filed on July 27, 1972 now U.S. Pat. No. 3,840,379 issued on Oct. 8, 1974. The $ZrO_2$ and $TiO_2$ containing compositions described in application Ser. No. 275,613 provide an unique combination of alkali-resistance, low liquidus temperature and desirable viscosity for the fiberization of glass compositions and for the reinforcement of cementitious materials. The glass compositions of application Ser. No. 275,613 have the following range of proportions by weight:

$SiO_2$, 60 to 62%; CaO, 4 to 6%; $Na_2O$, 14 to 15%, $K_2O$, 2 to 3%; $ZrO_2$, 10 to 11% and $TiO_2$, 5.5 to 8%.

E glass is a textile glass composition used for many years for the reinforcement of non-alkali matrices such as plastics. It is well known for its properties which allow it to be easily and economically fiberized in commercial quantities and at commercial rates using direct melt furnaces and fiberizing techniques. Typically, E glass has the following composition in percent by weight:

| Ingredient | E glass |
|---|---|
| $SiO_2$ | 54.6 |
| $Al_2O_3$ | 14.5 |
| CaO | 18.0 |
| MgO | 4.0 |
| $B_2O_3$ | 6.9 |
| $Na_2O$ | 0.4 |
| $TiO_2$ | 0.6 |
| $F_2$ | 0.6 |
| $Fe_2O_3$ | 0.4 |

The treated glass fibers of this invention can be successfully used as a reinforcing material in various cementitious products or matrices including cement, Portland cement, concrete, mortar, gypsum, and hydrous calcium silicate.

The term hydrous calcium silicate denotes crystalline compounds formed by the reaction of lime (CaO), silica ($SiO_2$) and water. Two hydrous calcium silicates generally of interest are: tobermorite, have the formula 4 CaO . 5 $SiO_2$ . 5 $H_2O$; and zonotlite, having the formula 5 CaO . 5 $SiO_2$ . $H_2O$. Hydrous calcium silicate products often are used as heat insulation materials.

The treated glass fibers of this invention can be used alone or in combination with asbestos fibers, mineral wool or organic fibers such as wood fibers in the production of cementitious products, especially calcium silicate products.

The organic materials are cellulosic type materials such as pulp fiber, cotton, straw, bagasse, wood flour, hemp, rayon coir fiber and the like.

The zirconyl ion exchange treatment of this invention is obtained by passing glass fibers through a bath containing an aqueous solution of ammonium zirconyl carbonate $[(NH_4)_3 ZrOH (CO_3)_3]$. A uniform coating or layer of ammonium zirconyl carbonate having at least monomolecular thickness is applied to the surface of the glass fibers. By the expression "uniform coating or layer" we mean that all points on the surface of the glass fibers are covered with a coating of the water solution of zirconyl ions. The surface treatment of zirconium is the result of the leeching out of a alkali metal or alkaline earth metal oxide ions from the surface of the glass and the replacement by zirconyl ions. The formation of the zirconium is believed to occur as follows:

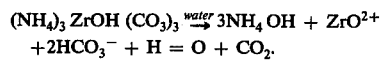

$$(NH_4)_3 ZrOH (CO_3)_3 \xrightarrow{water} 3NH_4 OH + ZrO^{2+} + 2HCO_3^- + H = O + CO_2.$$

The $HCO_3^-$ is believed to form the bicarbonate of the leeched alkali metal or alkaline earth metal ions to buffer the same, and the $NH_4 OH$ supplies the $OH^-$ necessary to effect the leeching action. It is known that alkali metal oxide ions and/or alkaline earth metal oxide ions are leeched out of the surface of E glass fibers wetted with water at room temperature within minutes. The zirconyl ion has a generally equivalent charge and an ionic radius approximately the same or less than the ions which we leeched out of the glass so that they effectively replace the leeched out ions. Once this ion exchange is completed by the zirconyl ion, the surface of the fibers then has improved resistance to further alkali attack.

An important facet of this invention resides in the use of an aqueous solution of ammonium zirconyl carbonate from which the zirconium treatment is derived. Ammonium zirconyl carbonate is soluble and can be used in aqueous solutions. Consequently, uniform treatment of the glass fibers is possible since the glass fiber can be completely immersed and passed through the solution. A uniform treatment is an essential requirement when the glass fiber is to be used in a hostile environment. It can be appreciated that an uncoated area on the glass fiber surface will be subject to attack at the unprotected spot. This would result in destruction of the fiber and the end of the fiber's utility as a reinforcing agent in a cementitious medium.

An aqueous solution of ammonium zirconyl carbonate has a further advantage of finding use in treating either bare fibers or fibers that are coated. The water based solution is compatible with coating compositions commonly applied to glass fiber. This permits flexibility in fiber treatment and processing.

As previously discussed, the protective zirconium treatment is believed to result from the ion exchange of the $(ZrO)^{++}$ ion out of the ammonium zirconyl carbonate coating initially applied to the glass fiber. As also stated earlier, the uniform treatment must be at least monomolecular in thickness. When the ammonium zirconyl carbonate is uniform and at least monomolecular in thickness, ion exchange will result in replacing of the alkali leechable ions in the surface of the fibers with zirconium oxide. It has been found that an aqueous ammonium zirconyl carbonate solution of less than 0.05% is inadequate to provide the uniform treatment required. It is normal to use a 0.05% to 2.0% solution of ammonium zirconyl carbonate. A concentration within this range insures that a uniform treatment of the glass surface is provided. In actual practice, the only limit to the upper concentration is economics. A monomolecular layer of zirconium oxide ions is sufficient to provide the protection required and multiple layers are unnecessary and wasteful. Using the recommended concentrations insures that the amount of zirconium oxide ions remaining on the surface is uniform and at least monomolecular in thickness. When solutions having the indicated concentrations are used, the weight of added material on the surface of the glass is 0.005% of the weight of the glass and the coating.

Present technology allows for the production of glass fibers having a diameter ranging from 0.0001 inch to 0.0004 inch at a rate of 10,000 feet to 15,000 feet per minute. Glass fibers are produced from small streams of molten glass which exude through tiny orifices located in what is called a bushing. Typically, bushings have 204 such orifices. The tiny streams of molten glass which issue from the bushing are attenuated by pulling the fibers until the diameters given above, result, and during which time the streams cool and solidify into what are called filaments.

A further advantage of using the aqueous ammonium zirconyl carbonate solution is the variety of means of application to which it is susceptible. The solution may be applied to the bushing to the bare glass fibers before they are gathered into a strand. The application may be deferred until the glas fibers are gathered into a strand thereby applying the solution to the bare strand. Alternatively, the solution may be applied to a strand which has been treated previously with a coating composition. Another option is to use the aqueous ammonium zirconyl carbonate as a component with other coating compositions. This mixture of coating compositions, having the aqueous ammonium zirconyl carbonate solution as one of its ingredients, may be applied using any of the means described above.

After the aqueous ammonium zirconyl carbonate solution is applied using any of the techniques previously described, the fibers remain wetted for minutes and preferably one hour or more. Leeching takes place during this period and thereafter the water is evaporated. The evaporation may take place naturally or by using drying means. It is preferred to use a drying means such as an oven or furnace since the rate of evaporation is increased substantially and the raising of temperature from room temperature aids the leeching action. The coated strand may be dried before collection as a package by passing it through a tube furnace. Alternatively, the coated strand may be wound and collected as a package and then placed in an oven for drying. In this case, the package may remain wet for 24 hours or more.

In the past, asbestos fibers have been very successful as a reinforcement for many types of inorganic matrices because of their characteristics and ability of the asbestos fibers to disperse and to provide some entangled network. The entangled network is generally through to be due to the non-uniformity of the length of the asbestos fibers, ranging anywhere from 1/10-inch to 4 inches in length. In order to employ glass fibers as a suitable replacement for asbestos fibers, it is generally thought that some of the characteristics possessed by the asbestos, fibers should be obtained with glass fibers. For this reason, the length of the glass fibers may range from 1/8-inch to about 2 inches in length are preferably from ½-inch to 1 inch in length in order to obtain some entanglement of the glass fibers upon dispersion of the glass fibers in the inorganic matrix. Furthermore, many inorganic matrices are susceptible to crack propagation. By the use of these longer fibers the fibers traverse the cracks thereby adding strength to the matrix. Blends of various lengths of glass fibers also can be employed.

If desired, other sizings, silanes, lubricants and the like also can be applied to the glass fibers.

The advantages of this invention are illustrated by the following examples. The reactants, proportions and other specific conditions are presented as being typical and should not be construed to limit the invention unduly.

EXAMPLE I

A 0.25% aqueous solution of ammonium zirconyl carbonate was prepared by diluting a 10% solution of ammonium zirconyl carbonate with the appropriate amount of deionized water [40 parts $H_2O$: 1 part 10% $(NH_4)_3 ZrOH (CO_3)_3$]. The 10% ammonium zirconyl carbonate solution is obtainable commercially from NL Industries.

EXAMPLE II

Glass fibers were formed having the following composition:

| Ingredients | Weight Percent |
|---|---|
| SiO₂ | 61.1% |
| CaO | 5.1% |
| Na₂O | 14.4% |
| K₂O | 2.6% |
| ZrO₂ | 10.4% |
| TiO₂ | 6.0% |

The glass composition was fiberized. The fibers were coated with the following size composition. Coating was carried out with an applicator roll. The coated fibers were dried at a temperature of about 260° F for 16 hours.

| Ingredient | Weight Percent |
|---|---|
| an acetate salt formed as the reaction product of polygonic acid with tetraethylene pentamine | 0.211 |
| an acetate salt formed as the reaction product of caprylic acid with tetraethylene pentamine | 0.09 |
| carbowax 1000-a polyethylene glycol with a molecular weight between 950 and 1050. | 0.251 |
| polyvinyl acetate | 5.8 |
| gamma aminepropyltriethoxysilane | 2.51 |
| glacial acetic acid | 0.1 |
| deionized water | remainder |

After treatment with the specified size composition, the fibers were gathered together as strands and wound on a collection package.

EXAMPLE III

Standard cement flex specimens were prepared as follows. Strands of glass fibers prepared as described in Example II were chopped. The chopped strands were mixed with cement and the mixture cast into standard cement flex bars. The bars were 12 in. by 0.5 in. by 2 in. The bars were then used to conduct cement flex tests. The cement flex test consists of supporting the flex bar at each end. Pressure is then applied to the center of the bar. The amount of force (pressure) required to fracture the bar is determined, measured in pounds per square inch. The test is conducted over a period of time at intervals. The results obtained for the cement flex specimens prepared as described in this example were as follows:

| | Reinforcement | |
|---|---|---|
| Time | Chopped Strand of Example III Flex (lbs./in.) | Chopped Strand of Example III Percent Retention |
| two weeks | 1942 | — |
| three weeks | 1676 | 86 |
| four weeks | 1611 | 83 |
| five weeks | 1547 | 80 |
| nine weeks | 1454 | 75 |

The figures indicated by four weeks are not the result of direct measurements. These values were arrived at by averaging direct measurements taken at three and five weeks. The four week period has been provided to facilitate comparison to the data provided in Example IV.

EXAMPLE IV

Standard cement flex specimens were prepared as follows. A package of strands of glass fiber prepared as described in Example II were passed through a bath of 0.25% aqueous ammonium zirconyl carbonate to completely cover all surfaces of the glass fibers with the carbonate solution. The aqueous ammonium zirconyl carbonate solution was prepared as described in Example I. The strands were passed through a tube furnace heated to a temperature of about 500° F. The furance was 4 feet in length. It required 10 to 30 seconds for the strand to pass through the furnace and the strands were dry upon exit. A uniform leeching and ion exchange by zirconium oxide was effected on the surface of the strand. The treatment was at least monomolecular in depth. Upon exit from the furnace, the strands were collected and wound to form a package. The strands, treated uniformly with zirconium oxide, were then chopped. The chopped strands so treated with zirconium oxide were mixed with cement and the mixture cast into standard cement flex bars. The bars were then used to conduct cement flex tests as described in Example III.

The results of the flex test using a cementitious matrix reinforced with glass fibers having a uniform surface treatment of zirconyl ion were as follows:

| | Reinforcement | |
|---|---|---|
| Time | Chopped Strand of Example IV Flex (lbs./in²) | Chopped Strand of Example IV Percent Retention |
| two weeks | 1825 | — |
| four weeks | 1810 | 99 |
| nine weeks | 1768 | 97 |

Comparison of the data from the flex tests as set forth in Examples III and IV demonstrate the protection provided glass fibers by a zirconyl treatment for glass fibers in a cementitious environment. Example III is illustrative of a reinforced cement bar. The chopped glass reinforcement was not treated with zirconyl ions. The cement bar of Example IV is identical to the cement bar of Example III except the chopped glass strands used as reinforcement were provided with a uniform ion exchange surface treatment of zirconyl ions.

While the invention has been described in considerable detail, we do not wish to be limited to the particular embodiments shown and described, and it is our intention to cover hereby all novel adaptations, modifications and arrangements thereof which come within the practice of those skilled in the art to which the invention relates.

We claim:

1. A method of preparing a cementitious matrix reinforced with glass fibers having on their surfaces a uniform coating at least monomolecular in thickness of zirconium dioxide comprising the steps of applying an aqueous solution of ammonium zirconyl carbonate to the surfaces of glass fibers, keeping the fibers wetted under etching conditions for a period of time to effect ion exchange with water extractable ions in the surface of the glass, evaporating the water from the resulting coating on the surfaces of the glass fibers, and incorporating the resulting coated glass fibers into a cementitious matrix.

2. A method according to claim 1 wherein the cementitious matrix is cement, hydrous calcium silicate, concrete, or mortar.

3. A method according to claim 2 wherein the cement is Portland cement.

4. A method according to claim 1 wherein the glass fibers are alkali resistant.

5. A method according to claim 1 wherein the aqueous solution of ammonium zirconyl carbonate is at least a 0.05% solution of ammonium zirconyl carbonate.

6. A method according to claim 1 wherein the aqueous solution of ammonium zirconyl carbonate is a 0.05% to 2.0% solution of ammonium zirconyl carbonate.

7. A method according to claim 1 wherein the amount of zirconium dioxide on the surfaces of the glass fibers is at least 0.005% by weight of the glass fibers and the coating.

* * * * *